(12) United States Patent
Baalmann et al.

(10) Patent No.: US 8,113,324 B2
(45) Date of Patent: Feb. 14, 2012

(54) DAMPING VALVE FOR A VIBRATION DAMPER

(75) Inventors: Helmut Baalmann, Bergrheinfeld (DE); Steffen Heyn, Niederwerrn (DE); Thomas Thein, Sennfeld (DE); Michael Hegmann, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 831 days.

(21) Appl. No.: 12/156,250

(22) Filed: May 30, 2008

(65) Prior Publication Data
US 2008/0296526 A1 Dec. 4, 2008

(30) Foreign Application Priority Data
Jun. 1, 2007 (DE) .................. 10 2007 025 677

(51) Int. Cl.
*F16F 9/34* (2006.01)
(52) U.S. Cl. .............. 188/322.15; 188/282.8
(58) Field of Classification Search ........... 188/282.1, 188/282.5, 282.8, 322.15, 322.22
See application file for complete search history.

(56) References Cited

U.S. PATENT DOCUMENTS

| | | | | |
|---|---|---|---|---|
| 5,911,290 A | * | 6/1999 | Steed | 188/282.4 |
| 6,651,781 B2 | * | 11/2003 | Lindegger et al. | 187/394 |
| 6,651,787 B2 | | 11/2003 | Grundei | |
| 7,201,260 B2 | * | 4/2007 | Diederich et al. | 188/322.15 |
| 7,228,948 B2 | * | 6/2007 | Wilda et al. | 188/322.15 |
| 7,703,586 B2 | * | 4/2010 | Deferme | 188/322.13 |
| 7,743,895 B2 | * | 6/2010 | Krawczyk | 188/282.8 |
| 2002/0027051 A1 | * | 3/2002 | Grundei | 188/322.15 |
| 2004/0245058 A1 | | 12/2004 | Diederich et al. | |
| 2011/0024247 A1 | * | 2/2011 | Chikamatsu | 188/322.15 |

FOREIGN PATENT DOCUMENTS

| | | |
|---|---|---|
| DE | 946758 | 8/1956 |
| DE | 100 41 199 | 11/2001 |
| DE | 2004 015 448 | 8/2005 |
| DE | 10 2005 040 283 | 3/2007 |
| DE | 1005 040 284 | 3/2007 |
| EP | 1484526 | 12/2004 |
| WO | WO 2007/022920 | 3/2007 |

* cited by examiner

*Primary Examiner* — Christopher Schwartz
(74) *Attorney, Agent, or Firm* — Cozen O'Connor

(57) ABSTRACT

A damping valve for a vibration damper includes a guide sleeve which slides on the piston rod of a vibration damper. An annular damping valve body which is provided with at least one through-opening is fixed axially by positive engagement on the guide sleeve, and the through-opening is covered at least partly by at least one valve disk which is biased by at least one closing spring which is supported at its end at a spring plate connected to the guide sleeve. The damping valve body and a spring plate which is constructed separate from the guide sleeve form a compression chain between two axially spaced stops of the guide sleeve.

14 Claims, 3 Drawing Sheets

DAMPING VALVE FOR A VIBRATION DAMPER

BACKGROUND OF THE INVENTION

1. Field of the Invention

The invention is directed to a damping valve of the type having a guide sleeve which slides on a piston rod of a vibration damper; an annular damping valve body which is axially fixed on the guide sleeve, the valve body having a through-opening; a valve disk at least partly covering the through-opening; at least one closing spring loading the valve disk against the through-opening; and a spring plate connected to the guide sleeve for supporting the closing spring.

2. Description of the Related Art

WO 2007/022920, FIG. 4, discloses a damping valve for a vibration damper which can execute an axial movement between two supporting springs on a piston rod. The damping valve comprises a damping valve piston which is fixed by positive engagement on a guide sleeve and which is outfitted at both ends with at least one valve disk which is biased in closing direction by at least one spring element. The spring element is supported at its end at a spring plate which is formed integral with the guide sleeve.

The guide sleeve is constructed in two parts in longitudinal direction and is closed by means of a snap-in connection. This constructional form of a damping valve, which is very compact in its entirety, does not meet the required conditions of longevity under extremely high loading. Further, the divided guide sleeve sometimes results in leaking within the damping valve that necessitates additional sealing means. However, this increases the space requirement.

SUMMARY OF THE INVENTION

It is the object of the present invention to secure a damping valve axially on a guide sleeve in a reliable manner and, in so doing, to prevent leaking within the damping valve.

According to the invention, this object is met in that the damping valve body and a spring plate which is constructed separate from the guide sleeve form a compression chain between two axially spaced stops of the guide sleeve.

The great advantage of the invention is that the parts forming the layers inside the compression chain are tight radially so that no leakage can occur between the structural component parts. When assembling, the structural component parts of the damping valve are slid on the guide sleeve and the guide sleeve can then expand radially at its end to a stop so that there is no axial play between the structural component parts.

In order to achieve partial geometries which are very simple to produce on the whole, a spacer sleeve is provided between a spring plate and the damping valve body. The biasing of the at least one biasing spring for the valve disk can be determined by the length of the spacer sleeve.

Alternatively, the spacer sleeve and the spring plate can also be constructed in one piece.

In order to keep the total amount of parts within the compression chain to a minimum, the spacer sleeve has a lift-limiting surface for the valve disk cooperating with the damping valve body.

The guide sleeve is produced as a rotary part, for example, In order to keep machining costs as low as possible, the spring plate extends radially over the stop of the guide sleeve.

On its side remote of the valve body, the spring plate has a supporting surface for a supporting spring acting on the damping valve, this supporting surface being constructed with centering means for the supporting spring. This step also serves to facilitate production of the guide sleeve.

In another advantageous construction, the supporting surface is constructed so as to project axially over the stop of the guide sleeve in direction of the supporting spring. This ensures that the supporting spring makes contact with the supporting surface and not with the stop of the guide sleeve.

The piston rod is divided into at least two functional areas. The damping valve slides in an axially movable manner on a piston rod carrying portion which is welded to a piston rod sliding portion. As a result of this modular type of construction, a standard constructional unit can be combined with different piston rod diameters in the piston rod sliding portion.

It is possible for the at least one supporting spring to be supported at a radial shoulder between the piston rod carrying portion and the piston rod sliding portion.

According to an advantageous embodiment, the piston rod carrying portion is constructed with the radial shoulder. Due to this construction, the radial shoulder can be dimensioned so as to be greater than would otherwise be allowed by the difference in diameter between the piston rod carrying portion and the piston rod sliding portion.

The axially movable damping valve is supported on the piston rod carrying portion so as to be movable axially between at least two supporting springs acting in opposing directions. One of the supporting springs is compressed between a stationary damping valve at the piston rod carrying portion and the axially movable damping valve, and the other supporting spring is compressed between the axially movable damping valve and the radial shoulder. This arrangement makes it possible for the valve devices to be mounted in their entirety as a constructional unit independent from the piston rod sliding portion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PREFERRED EMBODIMENTS

Figure 1:
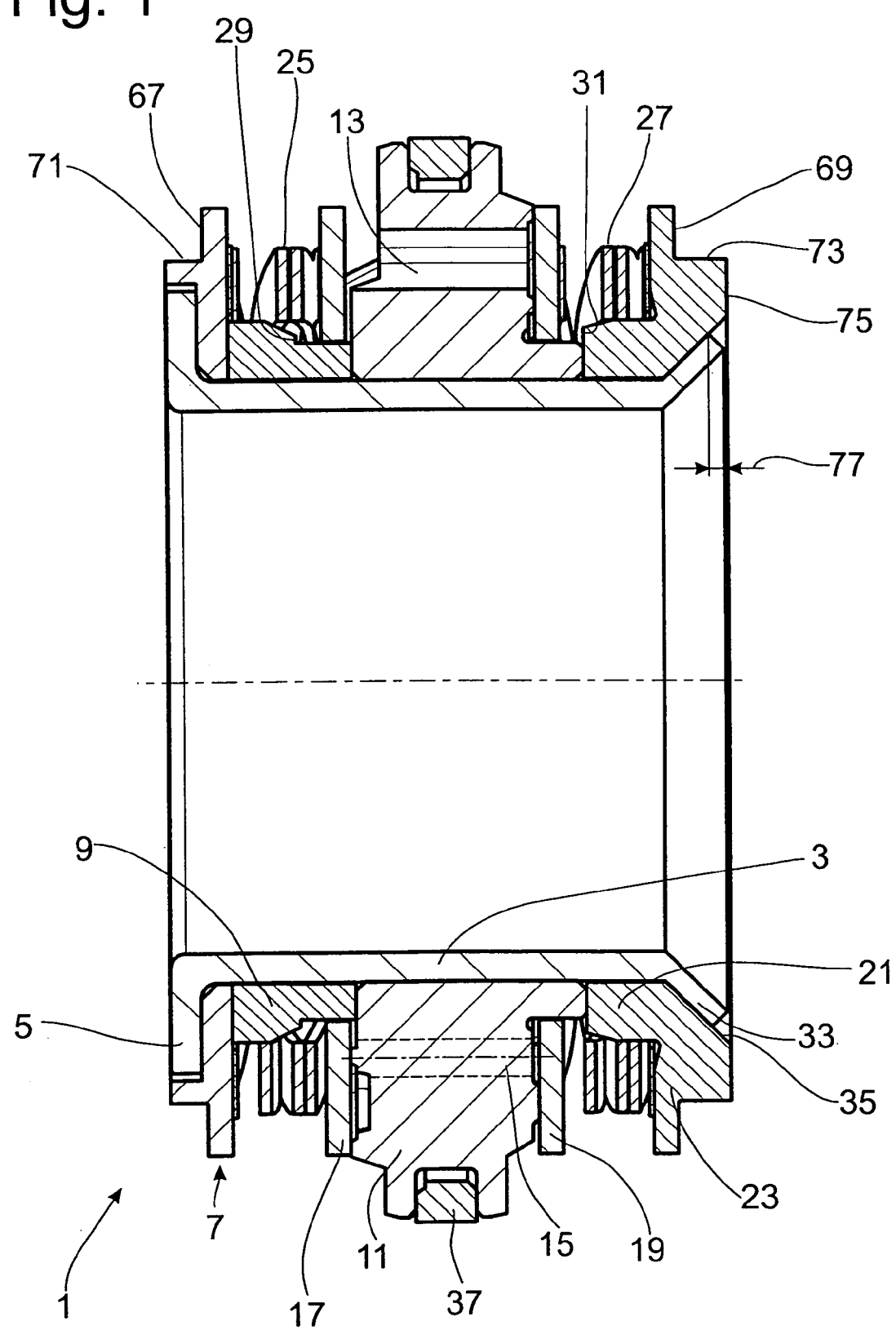
FIG. 1 shows a damping valve as an individual part.

FIG. 1 shows a damping valve 1 as a structural unit. A guide sleeve 3 forms the central structural component part and has at its end an angled stop 5 at which a first spring plate 7 stops. The spring plate extends radially over the stop 5 and is centered by its inner diameter on the guide sleeve 3. A first spacer sleeve 9 and a damping valve body 11 adjoin the spring plate 7. The damping valve body has through-openings 13; 15 for both through-flow directions. The through-openings are covered at the end at least partially by at least one valve disk 17; 19. A second spacer sleeve 21 is constructed integral with a second spring plate 23.

The valve disks 17; 19 are biased toward the damping valve body 11 by at least one closing spring 25; 27. The two spacer sleeves 9; 21 have a lift-limiting surface 29; 31 for the valve disks 17; 19. The above-mentioned structural component parts are slid onto the guide sleeve 3 and form a compression chain between the first stop 5 and a second stop 33. The second stop 33 is also formed by an area of the guide sleeve 3 that is angled radially outward. The inner side of the second spring plate 23 has a conical surface 35 around which the second stop 33 is shaped. In this way, the damping valve body 11 is fixed within the damping valve by a positive engagement. A sealing ring 37 in the damping valve body 11 can be mounted with the damping valve body or subsequently.

Figure 2:
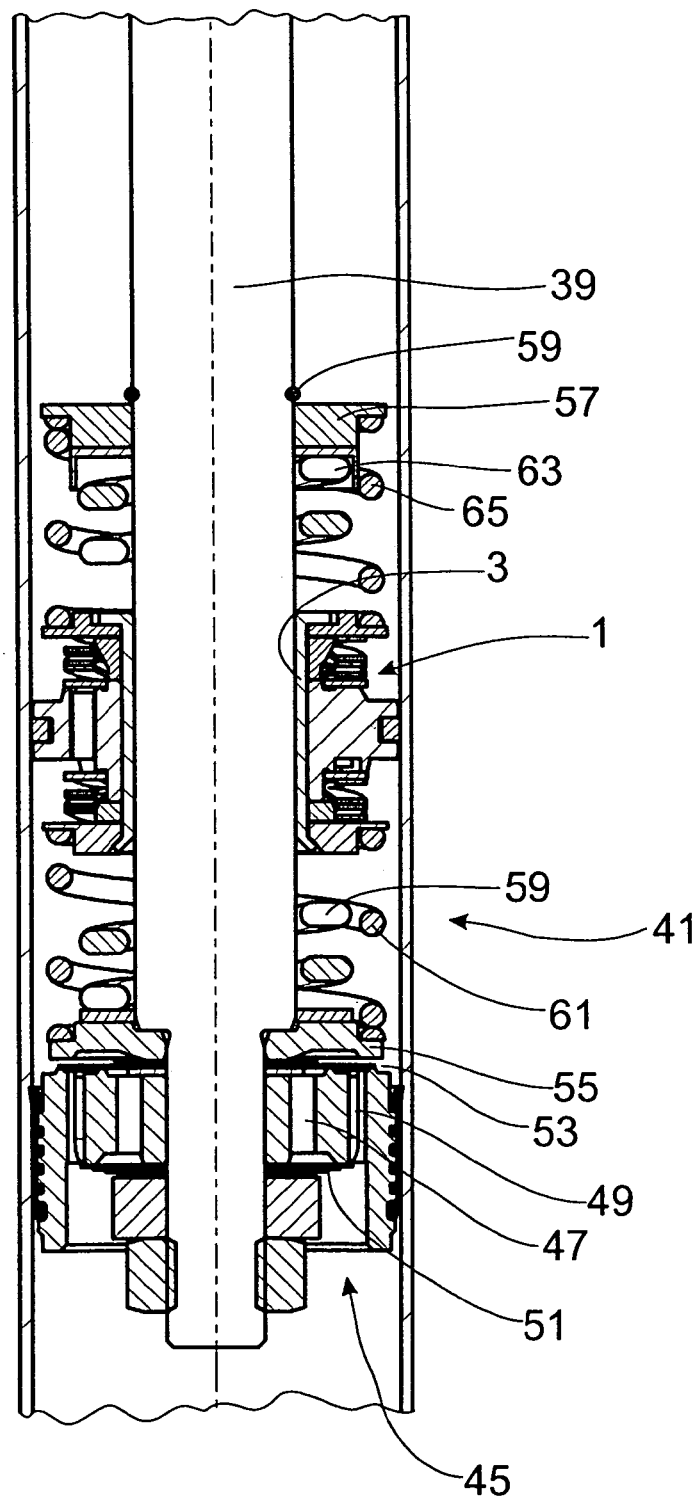
FIG. 2 shows a damping valve inside a vibration damper.

The damping valve 1, which now forms a constructional unit, slides by its guide sleeve 3 on a piston rod 39 of a vibration damper 41 which is shown by the section in FIG. 2. A piston valve is arranged at the piston rod as a stationary damping valve 45. The stationary damping valve 45 likewise has through-openings 47; 49 for the two flow directions in connection with at least one valve disk 51; 53, respectively, which are biased in closing direction toward a piston body 55. The stationary damping valve 45 has a supporting disk 55 which defines the lift movement of the at least one valve disk 53. A second supporting disk 57 is fastened to the piston rod 39 at an axial distance from the latter by a retaining ring 59. The damping valve 1 can carry out a relative movement against the oppositely directed forces of supporting springs 59; 61; 63; 65 relative to the piston rod 39 between the two supporting disks 55; 57. The inner supporting springs 59; 63 are constructed so as to be shorter than the outer supporting springs 61; 65 to achieve a graduated characteristic of the supporting forces. With respect to a short structural length, the inner supporting springs have a rectangular or oval wire cross section.

The outer supporting springs 61; 65 act on supporting surface 67; 69 of the spring plates 7; 23 (see FIG. 1) which are constructed on the side remote of the valve body. Centering walls 71; 73 prevent radial wandering of the outer supporting springs 61; 65 on the supporting surfaces 67; 69. A supporting surface 75 which adjoins the conical surface 35 is constructed so as to have an axially projecting length 77 with respect to the second stop 33 so that the inner supporting spring 59 always makes contact with the supporting surface 75.

Figure 3:
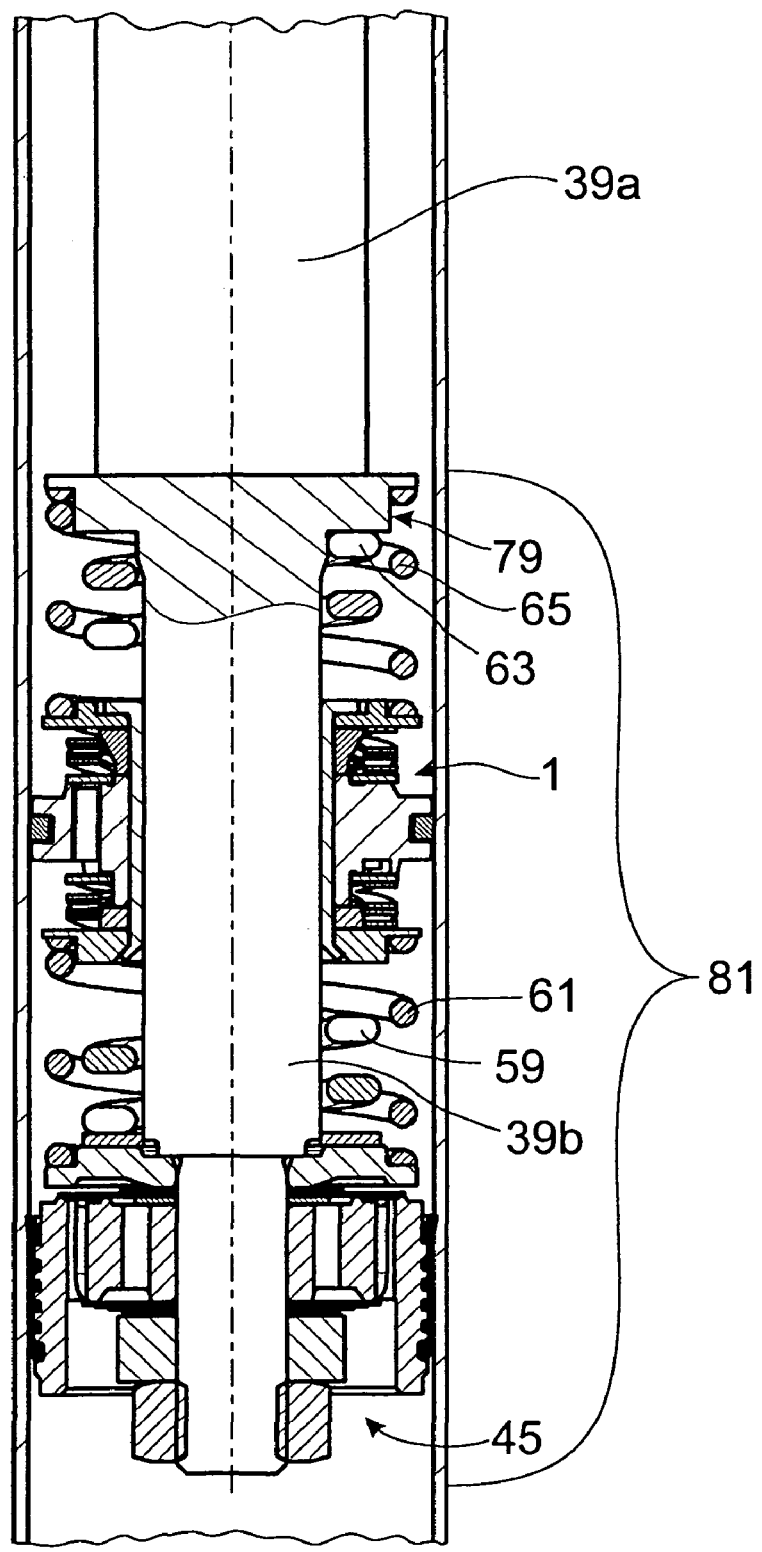
FIG. 3 shows a damping valve with a multiple-part piston rod.

FIG. 3 shows an embodiment form of a vibration damper 41 with an axially movable damping valve 1 according to FIG. 1. The substantial difference in relation to FIG. 2 is that the piston rod comprises at least one piston rod sliding portion 39a and a piston rod carrying portion 39b. The piston rod sliding portion forms the portion which can cooperate with a piston rod guide, not shown. The piston rod carrying portion has, at its end, a radial shoulder 79 in direction of the piston rod sliding portion, the two supporting springs 63; 65 making contact with this radial shoulder 79.

When assembling, the piston rod carrying portion, which is separate from the piston rod sliding portion, is outfitted with the supporting springs 63; 65 and with the damping valve 1 that exists as a constructional unit. The supporting springs 59; 61 are then slid onto the piston rod carrying portion and the structural component parts comprising the damping valve 45 so that the damping valve 1 is tensioned between the stationary damping valve 45 and the radial shoulder 79 of the piston rod carrying portion by the supporting springs 59-65. This whole constructional unit 81 is fastened to the piston rod sliding portion 39a by a welding process, e.g., friction welding.

The basic operation of the vibration damper is known from U.S. Pat. No. 6,651,787, the disclosure of which is incorporated herein by reference.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A damping valve for a vibration damper, the damping valve comprising:
   a guide sleeve which slides on a piston rod of a vibration damper, the guide sleeve having a pair of axially spaced stops;
   an annular damping valve body which is axially fixed on the guide sleeve, the valve body having at least one through-opening;
   at least one valve disk at least partly covering said through-opening;
   at least one closing spring loading a respective said at least one valve disk against said opening; and
   at least one spring plate received against a respective at least one of said stops and supporting a respective said at least one closing spring, wherein the at least one spring plate is constructed separately from the guide sleeve,
   wherein the damping valve body and the at least one spring plate form at least part of a compression chain between the axially spaced stops.

2. The damping valve of claim 1 further comprising at least one spacer sleeve located between a respective said at least one spring plate and the damping valve body.

3. The damping valve of claim 2 wherein at least one said spacer sleeve and a respective at least one said spring plate are formed as a single piece.

4. The damping valve of claim 2 wherein at least one said spacer sleeve has an axially facing shoulder which limits the axial travel of a respective said valve disk.

5. The damping valve of claim 1 wherein the at least one spring plate extends radially beyond the respective at least one stop.

6. The damping valve of claim 5 wherein the at least one spring plate has a support surface for a coil spring facing away from the valve body, and a centering wall which centers the coil spring on the support surface.

7. The damping valve of claim 6 wherein the centering wall extends axially as far as the respective said stop of the guide sleeve.

8. A vibration damper comprising:
   a piston rod comprising a carrying portion welded to a sliding portion; and
   an axially movable damping valve mounted to slide on the carrying portion, the damping valve comprising:
   a guide sleeve which slides on the carrying portion, the guide sleeve having a pair of axially spaced stops;

an annular damping valve body which is axially fixed on the guide sleeve, the valve body having at least one through-opening;

at one valve disk at least partly covering said through-opening;

at least one closing spring loading a respective said at least one valve disk against said opening; and at least one spring plate received against a respective at least one of said stops and supporting a respective said at least one closing spring, wherein the at least one spring plate is constructed separately from the guide sleeve, wherein the damping valve body and the at least one spring plate form at least part of a compression chain between the axially spaced stops.

9. The vibration damper of claim 8 wherein the piston rod further comprises a radial shoulder between the carrying portion and the sliding portion, the damper further comprising a coil spring supported between the radial shoulder and the axially movable damping valve.

10. The vibration damper of claim 9 wherein the radial shoulder is formed as one piece with the carrying portion.

11. The vibration damper of claim 9 further comprising a stationary damping valve fixed to the carrying portion.

12. The vibration damper of claim 11 further comprising a coil spring supported between the stationary damping valve and the axially movable damping valve.

13. The vibration damper of claim 11, wherein the guide sleeve and its axial steps are configured as a single piece, the stop formed by a body in the guide sleeve.

14. The vibration damper of claim 11 further comprising at least one spacer sleeve located between a respective said at least one spring plate and the damping valve body.

* * * * *